June 27, 1967     E. SIRTL     3,328,199
METHOD OF PRODUCING MONOCRYSTALLINE SILICON OF HIGH PURITY
Filed Sept. 16, 1963
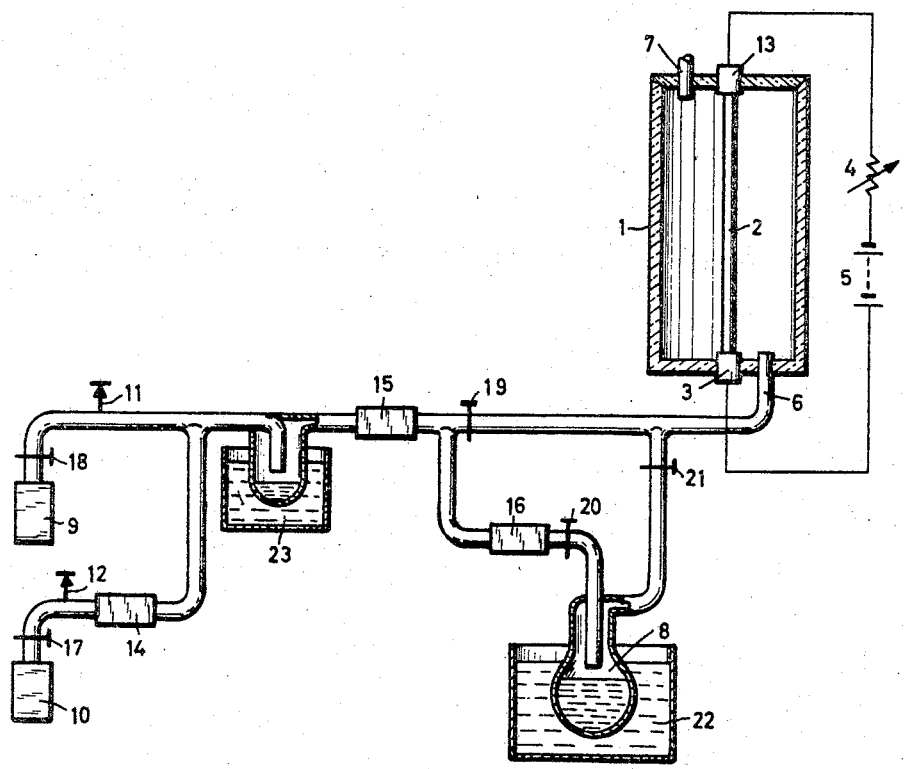

3,328,199
METHOD OF PRODUCING MONOCRYSTALLINE
SILICON OF HIGH PURITY
Erhard Sirtl, Munich, Germany, assignor to Siemens &
Halske Aktiengesellschaft, Munich, Germany, a corporation of Germany
Filed Sept. 16, 1963, Ser. No. 309,264
4 Claims. (Cl. 117—201)

My invention relates to a pyrolytic method of producing silicon in form of monocrystalline bodies exhibiting a high degree of purity as required for electronic and similar purposes.

It is known to produce compact silicon by passing a reaction gas mixture of purified hydrogen with a preferably halogen-containing silicon compound, for example a halogen silane, along a heated carrier body of silicon mounted in a reaction vessel, and maintaining the silicon body at a high temperature sufficient for thermally dissociating the silicon compound and thereby causing the resulting silicon to precipitate from the gas upon the carrier body. In this method, the silicon-to-hydrogen ratio in the reaction gas is at least about 2 atom percent, and the gas also contains boron in form of vaporous or gaseous boron compounds, the maximal atomic ratio of boron to silicon being about 0.1 atom percent. It is preferable to add to the reaction gas mixture a hydrogen-halogen compound, such as HCl, that displaces the reaction equilibrium in disfavor of the liberated and precipitating silicon and to maintain the carrier surface upon which the silicon is being precipitated, above the minimum dissociation temperature for silicon but below the minimum dissociation temperature for boron. In this manner, the precipitation of undesired dopants, particularly boron, during the growth of the precipitating silicon layer is prevented.

In principle, it is also possible, when producing boron by pyrolytic dissociation and precipitation, to displace the dissociation equilibrium of disturbing boron compounds in the reaction gas by an addition of hydrogen-halogen compounds, for example hydrogen halide.

Whether boron precipitates together with silicon upon the carrier body of silicon is also dependent upon the proportion of hydrogen contained in the reaction gas mixture from which the dissociation and precipitation of silicon takes place. That is, an increasing hydrogen content displaces the equilibrium of the reaction in favor of boron segregation and thus reduces the minimum temperature $T_0$ required for the precipitation of boron. To prevent boron precipitation, the molar ratio of silicon compounds to hydrogen should therefore not decrease below the value of 0.02 (2%).

It has been found preferable to precede the above-described process by heating the silicon carrier body in pure hydrogen to incandescent temperature shortly before permitting the reaction gas mixture to pass into the reaction vessel. Such annealing of the silicon carrier, prior to pyrolytic dissociation of the gaseous silicon compound, results in a reaction according to the equation $$SiO_2 + H_2 \rightarrow SiO + H_2O$$ 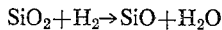

As a result, the oxide coating always present on the carrier surface is eliminated by formation of gaseous SiO, thus according an undisturbed growth of the subsequently preciptating silicon upon the now exposed crystal lattice of the silicon body.

However, difficulties have been encountered with such pre-annealing of the silicon carrier in pure hydrogen, and the products obtained in this manner have often failed to exhibit the expected high degree of purity but have shown uncontrollable amounts of undesired extrinsic conductance.

It has been discovered that these detrimental phenomena are due to effects that occur when passing from annealing in pure hydrogen to supplying the normal reaction gas mixture which contains the above-mentioned halogen silane. During this transfer, the reaction passes through a stage in which the segregation and precipitation of impurities, particularly of boron, becomes particularly intensive. This can be explained by the fact that the segregation of boron is determined by the proportion of hydrogen contained in the reaction gas mixture. The segregation of other substances that effect extrinsic conductance in silicon is also influenced by the hydrogen contained in the gas mixture. When changing from the hydrogen atmosphere to the reaction gas mixture, the hydrogen concentration at the beginning of the dissociation process becomes particularly high relative to concentration of the halogen silane, for example chlorsilane. In other words, the molar ratio of silicon compound to hydrogen is reduced, at least for a short interval of time, below the abovementioned minimum ratio of 0.02, thus promoting the segregation and precipitation of boron and also of other impurities, particularly aluminum. This impurity segregation is thereafter terminated only when according to the reaction equation $$SiHCl_3 + H_2 \rightarrow Si + 3HCl$$ 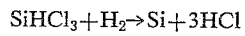

a sufficient amount of HCl has been formed so that the reaction equilibrium is displaced to an extent at which the temperature of the carrier surface is below the minimum temperature for segregation of boron and other impurities contained in the reaction gas.

It is an object of my invention to provide a method which in a particularly simple manner affords preventing the above-mentioned detrimental phenomena to occur in the transition interval between annealing of the silicon carrier in hydrogen and the subsequent commencement of the pyrolytic silicon dissociation proper. Another, more specific object is to afford completing a satisfactory purification of the silicon carrier surface by annealing within a very short interval of time, thus reducing the amount of time required for preparatory operation prior to commencing the pyrolytic production proper.

According to my invention, the monocrystalline carrier body of silicon is heated to annealing temperature and in this condition, prior to commencing the pyrolytic dissociation of silicon, is subjected to a gas flow whch, in addition to the reaction gas mixture of silicon compound and hydrogen, contains a hydrogen-halogen compound, such as HCl, which displaces the reaction equilibrium in disfavor of silicon precipitation and is added to the reaction gas mixture in a quantity sufficient to prevent the dissociation of silicon as well as boron. Thereafter the amount of the added hydrogen-halogen compound is reduced until the pyrolytic dissociation of silicon and its precipitation from the reaction gas mixture upon the heated carrier commences, whereupon the process is continued in the above-described known manner.

By virtue of such a relatively short-lasting annealing of the monocrystalline carrier body in a gas mixture of hydrogen and halogen-silicon compound greatly enriched with hydrogen-halide, the segregation and precipitation of impurities is reliably prevented in a particularly simple manner throughout the entire process, including the initial stage of silicon dissociation during which the change from surface purification of the carrier rod to the precipitation process proper takes place. The large proportion of hydrogen halide in the gas mixture may not only displace the reaction equilibrium in disfavor of silicon but may also effect a complete prevention of silicon precipitation. For each surface temperature of the carrier body there exists a specific ratio of silicon compound to hydrogen-halogen compound at which no silicon dissociation takes place. According to the invention, this ratio or, if desired, a smaller ratio, is adjusted in the gas mixture in which the carrier body is to be annealed for purifying its surface. The hydrogen-halogen compound then simultaneously takes care of accelerating the removal of the oxide skin from the carrier body. The reaction takes place in accordance with the equations:

$$SiO_2 + H_2 \rightarrow SiO + H_2O$$
$$SiO + 2HX \rightarrow SiX_2 + H_2O$$

(X=halogen).

Accordingly, the hydrogen-halogen compound is added in such a quantity that silicon is dissolved and eliminated from the carrier body. For a given temperature of the carrier body this is done by reducing the ratio of silicon compound to hydrogen-halogen compound with respect to the particular value of the ratio at which just no dissociation takes place. In other words, the method is preferably performed by adding to the gas mixture more hydrogen-halogen compound than corresponds to the critical ratio. As a result, a surface layer of silicon becomes dissolved from the carrier body, the thickness of the eliminated layer being dependent upon the amount of time in which the carrier body is annealed in the gas mixture. In this manner, the exposure of the undistributed silicon crystal lattice is promoted and a monocrystalline growth of the subsequently precipitating silicon secured. According to a preferred mode of performing this method, the carrier body is heated to incandescent or pyrolytic temperature in the gas mixture for a sufficiently long period of time to eliminate a layer whose thickness is a multiple of that of the oxide coating present on the carrier body prior to the annealing operation.

After purifying the surface of the carrier body in the above-described manner, the process is contained by reducing the supply of hydrogen-halogen compound. Thus, the reaction equilibrium is displaced in favor of silicon, commencing the dissociation of silicon and its precipitation from the gaseous phase upon the carrier body. The reduction of the hydrogen-halogen content in the gas mixture is effected gradually and so slowly that the hydrogen-halogen content, when the silicon dissociation commences and also thereafter, prevents undesirable dopants, particularly boron, to be dissociated from the reaction gas mixture. That is, the hydrogen-halogen content displaces the reaction equilibrium in disfavor of such impurities to such an extent that the temperature of the carrier body remains below the minimum required for pyrolytic dissociation of these substances.

When the dissociation of the silicon compound for precipitation of silicon upon the carrier is to take place in accordance with the reaction equation $$SiHCl_3 + H_2 \rightarrow Si + 3HCl$$

the quantity of the hydrogen-halogen compound added to the gas mixture must be reduced greatly, or the supply of hydrogen-halogen compound must be completely terminated, as the hydrogen-halogen compound, in this case HCl, evolving from the dissociation of the silicon becomes progressively sufficient to prevent the dissociation of impurities.

An example of the method according to the invention will be described with reference to the embodiment of suitable processing equipment schematically illustrated, by way of example, on the accompanying drawing.

Mounted in a processing vessel 1 of quartz is a thin rod 2 of monocrystalline silicon. The silicon has the high degree of purity required for electronic purposes and may have either intrinsic conductance or contain dopant to exhibit a desired extrinsic conductance. The rod serves as a core for receiving pure silicon which is to grow on the rod surface from substance dissociated from a reaction gas mixture and may likewise have intrinsic conductance or be doped for a given type of extrinsic conductance. The rod 2 is mounted at its end in holders 3 and 13 of highly pure and heat-resistant material, for example graphite. The rod 2 is heated by electric current furnished through a controllable stabilizing resistor 4 from a voltage source 5. During operation the rod is at first maintained at a temperature of about 1150° C. An evaporator vessel 8 of quartz contains a liquid silicon-halogen compound. Suitable, for example, is highly purified silicochloroform (SiCHl_3). Hydrogen is supplied from a storage vessel 9 through a pressure-reduction valve 18. Hydrogen chloride (HCl) is supplied from a storage vessel 10 through a reduction valve 17. The gas lines issuing from the two storage vessels are provided with respective over-pressure valves 11 and 12 and are joined with each other so that the hydrogen and hydrogen-chloride become mixed. The flow velocity and thus the quantity of the added HCl is measured by a flow meter 14. A cooling trap 23 serves for freezing and eliminating any steam contained in the gas mixture. The current of mixed gas consisting of $H_2$ and HCl passes through the evaporator 8 where it becomes charged with the vapor of the silicon compound before entering into the processing vessel 1 through an inlet pipe 6. The residual gases leave the vessel through an outlet 7.

The evaporator 8 is mounted in a temperature bath 22 with whose aid the evaporation rate of the silicon compound is adjusted. By thus adjusting the temperature in the evaporator and by actuating the valves 17, 18 and 19 to 21, the composition of the reaction gas mixture can be controlled and regulated in any desired and predetermined manner. Two additional gas-flow meters 15 and 16 permit, together with meter 14, the individual component of the gas mixture to be measured in order to be properly adjusted.

For cleaning the surface of the carrier rod in accordance with the method of the invention, the composition of the gas mixture entering at 6 into the reaction vessel is so adjusted that it is composed of 30% of hydrogen chloride (HCl), 5% of silicochloroform (SiHCl_3) and 65% hydrogen ($H_2$). The gas composition, however, may be varied within rather wide limits. For example, according to another mode of practicing the invention, the composition of the gas mixture consists of 30% hydrogen chloride, 2% silicontetrachloride (SiCl_4) and 68% hydrogen. The speed at which this gas mixture passes through the reaction vessel is kept between about 50 and 100 liters per hour. Within this range, the gas-flow speed and quantity, for the above-mentioned annealing temperature of 1150° C., is below the flow speed to be maintained during the subsequent pyrolytic dissociation and precipitation of silicon. While maintaining the just mentioned gas flow, the carrier body 2 is kept at the temperature of about 1150° C. a sufficient length of time to eliminate the oxide skin. The time is not critical and therefore is preferably extended so that the layer of material eliminated from the surface of the silicon rod has a thickness three or more times that of the oxide skin. As a rule, such a multiple layer thickness of the oxide skin is eliminated in a period of about 5 to 30 minutes. In the specific examples of substances and gas compositions described above, it has been found that a maximum time of 20 minutes is sufficient.

Thereafter the HCl supply is reduced by gradually closing the control valve 17. As a result, the reaction equilibrium in the gas mixture passing through the vessel is progressively displaced in favor of silicon dissociation. Simultaneously, the flow speed of the gas is considerably increased over that maintained during the above-mentioned cleaning operation, namely to more than twice or a multiple of the speed previously maintained. It has been found that a gas-flow speed of approximately 500 liter per hour is suitable. However, the optimum value for silicon dissociation in each case depends upon the size and shape of the processing vessel and also upon the type or design of the gas-supply nozzle if such a nozzle is used at the outlet opening of the supply pipe 6. Under the conditions now established, an epitaxial growth of monocrystalline silicon on the carrier rod by dissociation and precipitation of silicon from the gaseous phase takes place and is maintained in the conventional manner until the rod has grown to the desired ultimate thickness.

After completing the above-described purifying operation, the temperature of the carrier rod 2 may also be changed, preferably increased, and in this manner the silicon dissociation from the gaseous phase can be obtained or at least promoted. Thus, for example, the temperature in the above-described process can be increased from the initial annealing temperature of about 1150° C. to a normal pyrolytic processing temperature between 1200 and 1250° C. Aside from the above-mentioned silicon-halogen compound, other silicon-halogenides, for example $SiHBr_3$ or $SiBr_4$, can be employed. Suitable in the latter cases as additional hydrogen halide is hydrogen chloride which is to be used in substantially the same manner as described above.

While in the examples described in the foregoing the monocrystalline lattice structure of the silicon carrier body is laid bare only by the above-mentioned gaseous mixture containing a silicon compound, it is in some cases advisable to subject the carrier rod, prior to passing the just mentioned gas mixture into the processing vessel, to additional pre-etching or precleaning of the carrier surface by heating the carrier body in a gas atmosphere that contains only hydrogen or only a mixture of hydrogen with a hydrogen-halogen compound such as HCl.

I claim:

1. The method of growing hyperpure monocrystalline silicon upon a heated carrier of silicon by pyrolytic dissociation from a reaction gas mixture of a halogen silane and pure hydrogen in a molar ratio of halogen silane to hydrogen of at least 0.02, which comprises heating the carrier to incandescent temperature and subjecting the heated carrier, prior to commencing the pyrolytic dissociation of silicon, to a gas flow containing, in addition to said mixture of halogen silane and hydrogen, hydrogen chloride to shift the reaction equilibrium in disfavor of silicon precipitation and prevent dissociation of silicon as well as boron; and thereafter reducing the addition of said hydrogen chloride to said gas flow for precipitation of silicon upon the heated carrier.

2. The method of growing hyperpure monocrystalline silicon upon a heated carrier of silicon by pyrolytic dissociation from a reaction gas mixture of silicon-halogen compound and hydrogen in a molar ratio of silicon halogen compound to hydrogen of at least 0.02, which comprises heating the carrier to pyrolytic reaction temperature and subjecting it in heated condition, prior to commencing the silicon dissociation, to a gas flow containing, in addition to said mixture of silicon-halogen compound and hydrogen, a hydrogen chloride in a quantity sufficient to prevent precipitation of silicon as well as boron; and thereafter reducing the addition of said hydrogen chloride to said gas flow for commencing the precipitation of silicon upon the carrier.

3. The pyrolytic method of producing silicon according to claim 1, wherein the addition of said hydrogen chloride is reduced after a surface layer is removed by dissolution in said gas mixture.

4. The pyrolytic method of producing silicon according to claim 2, wherein the addition of said hydrogen chloride is reduced after dissolution of a surface layer equal in thickness to a multiple of the oxide coating present on the carrier prior to heating.

References Cited

UNITED STATES PATENTS

| | | | |
|---|---|---|---|
| 3,120,451 | 2/1964 | Schmidt et al. | 117—106 |
| 3,172,857 | 3/1965 | Sirtl | 117—106 |
| 3,212,922 | 10/1965 | Sirtl | 117—106 |
| 3,243,323 | 3/1966 | Corrigan et al. | 23—223.5 X |

ALFRED L. LEAVITT, *Primary Examiner.*

A. GOLIAN, *Assistant Examiner.*